United States Patent [19]

Harris

[11] Patent Number: 5,063,876

[45] Date of Patent: Nov. 12, 1991

[54] MEANS AND METHODS FOR TRAINING AND CONTAINING ANIMALS

[75] Inventor: Stephen W. Harris, Cottonwood, Ariz.

[73] Assignee: William C. Velvin, Scottsdale, Ariz.

[21] Appl. No.: 549,582

[22] Filed: Jul. 6, 1990

[51] Int. Cl.⁵ ............................................... A01K 1/02
[52] U.S. Cl. .......................................... 119/20; 256/25
[58] Field of Search ............... 119/20; 256/23, 24, 256/25, 30, 31

[56] References Cited

U.S. PATENT DOCUMENTS

| | | | |
|---|---|---|---|
| 2,451,431 | 10/1948 | Bible | 256/23 |
| 2,771,088 | 11/1956 | Soldman | 256/12.5 X |
| 2,872,161 | 2/1959 | Olson | 256/12.5 X |
| 3,537,688 | 11/1970 | Stein | 256/24 |
| 4,576,364 | 3/1986 | O'Fearna | 256/24 |
| 4,730,810 | 3/1988 | Rambaud | 256/23 X |
| 4,738,563 | 4/1988 | Clark | 256/23 X |

Primary Examiner—Gene Mancene
Assistant Examiner—R. Thomas Price
Attorney, Agent, or Firm—Richard R. Mybeck

[57] ABSTRACT

A rope corral for training and containing animals, such as horses, having an elongated netting supported by a plurality of independently secured pole members and having a rope member circumscribing the median thereof to define a resilient enclosure therewith having a gateway disposed therewithin.

14 Claims, 1 Drawing Sheet

MEANS AND METHODS FOR TRAINING AND CONTAINING ANIMALS

INTRODUCTION

The present invention relates generally to means and methods for training and/or containing animals, specifically horses, in any suitable location, and more particularly to a novel fully portable free-standing free-form resilient pen and methods of using same to train and restrain animals.

BACKGROUND OF THE INVENTION

The need to contain livestock for purposes of control, show or shelter is well known and has caused a multitude of permanent and portable devices to be developed through the years. While the present invention falls generally within the class of portable pens, it has the totally unexpected propensity of providing a unique tool for the discipline and training of animals, especially horses.

Prior art devices include numerous portable pens, corrals, shelters, stockades, fences, and screens that can be used to define enclosed areas for the containment of livestock or children.

For instance, Sommer (U.S. Pat. No. 1,330,434) describes a pen for exhibiting livestock which comprises a plurality of discrete panels which are adapted to be interconnected to define pens of different sizes and designs and having one or more compartments. Each panel is formed with bottom, top and end bars covered by wire fabric so as to be individually hung and swung as farm gates are swung.

Bible (U.S. Pat. No. 2,451,431) discloses a portable play pen, primarily for children, which embodies a collapsible fence coactive with means for supporting the fence in an upright position to define the pen. Specifically, this device is comprised of flexible wall members or panels supported by rigid posts to define an enclosed rectangular play area. The pen is anchored to guy wires at the corners of the wall members which in turn are attached to stakes driven in the ground a short distance therefrom and used to tighten the flexible members of the fence. The fence panel members are formed by stringing a plurality of individual slats in spaced parallel relationship, one to another, to complete a panel.

Wong (U.S. Pat. No. 4,124,198) also teaches a portable plastic fence comprising easily interconnectable post sections including a base section which is anchored into the ground and a plurality of extension post sections which are mountable one in each of the base post sections to create a fence of a predetermined height. In one embodiment, horizontal struts are connected between spaced post sections while in another embodiment, panel means are connected between the post sections.

O'Fearna (U.S. Pat. No. 4,576,364) discloses a portable screen of fabric held upright by a plurality of hollow poles clamped to the fabric by C-clamps. A stake is telescoped within each hollow pole and held in an extended position by the friction of a resilient sleeve near the top of the stake. The pole/stake assembly is driven into the ground.

Despite the general similarity of appearance, none of the foregoing references either teach or suggest means and methods for containing and training animals therewith in the manner of the present invention and fail to provide the unexpected advantages thereof as shall hereinafter appear in the detailed description of the preferred embodiments of the present invention.

BRIEF SUMMARY OF THE INVENTION

The present invention relates to means and methods for effectively containing and training horses and like livestock which means is easily moved, readily installed, and less expensive than traditional forms of containment and which when used in accordance herewith, provides novel and unique means and methods for training by obtaining mind control over a previously free-willed, untrained or recalcitrant animal.

More particularly, the present invention includes means for defining a preselected area of containment and supporting a resilient woven fabric thereabout to define, either independently or in combination with a portable horse stall or trailer, a training ring which, as will appear, functions to produce a psychological restraint on the mind of the animal trainee while simultaneously producing a non-harmful physical restraint on the range of its movement.

Accordingly, it is a principal object of the present invention to provide novel and unique means and methods for restraining and training previously untrained or recalcitrant animals, such as horses, which means can be quickly and readily installed in any desired location which provides a reasonably flat area within the confines of the pen produced thereby.

Another object of the present invention is to provide novel and unique means for containing an animal, such as a horse, and which, when used for training, provides the horse with sufficient long range vision to avoid alarm, a short vision allusion of absolute restraint, and a trampoline-like effect should the animal actually bolt into the containment structure.

These and still further objects as shall hereinafter appear are readily fulfilled by the present invention in a remarkably unexpected fashion as will be readily discerned from the following detailed description of the preferred embodiment thereof especially when read in conjunction with the accompanying drawing in which like parts bear like numerals throughout the several views.

DETAILED DESCRIPTION OF PREFERRED EMBODIMENTS

Figure 1:
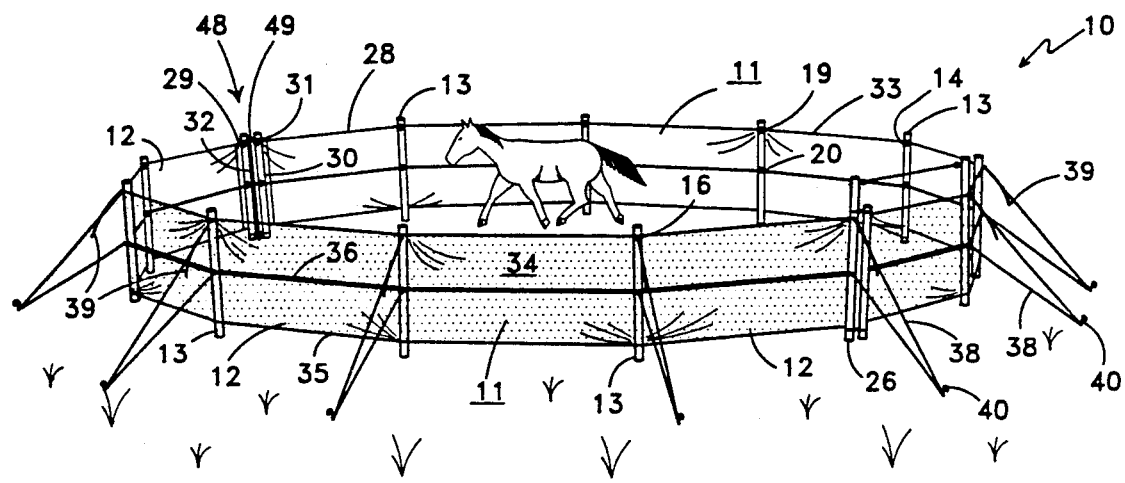
FIG. 1 is an isometric view of an animal training and restraining device embodying the present invention.

Referring to the drawing, and particular to FIG. 1, a means for training and containing animals in accordance with the present invention is identified by the general reference 10 and will be herein referred to as "corral assembly 10".

Each corral assembly 10 comprises one or more horizontally extending sections 11, each of which is formed of net or mesh material and segregated into a plurality of horizontal extending panel portions 12 by the positioning and securing a plurality of support poles 13 transversely of section 12 in spaced generally parallel relationship to each other. Each support pole 13, which can be formed of ultraviolet resistant polyvinyl chloride or like durable plastic material, has a first or upper hole 14 and a second or middle hole 15 defined therethrough in registry with a corresponding upper panel hole 16 and middle panel hole 17 defined in panel portion 12 in vertical alignment with each other and positioned to define the preselected position for the corresponding support pole 13.

In a preferred practice, panel holes 16, 17 in panel portion 12 may each be provided with a suitable steel grommet 18 or like protective insert to prevent the netting of horizontally extending panel 12 from tearing during use.

A suitable fastener 19 is inserted through corresponding upper post hole 14, and upper panel hole 16 and a like fastener 20 is inserted through corresponding middle post hole 15 and middle panel hole 17 to attach horizontally extending section 11 to each of several support poles 13. Upper panel holes 16 and medial panel holes 17 in horizontally extending section 11 respectively define a section 11 between the proximal and the distal end thereof. That is to say, upper panel holes 16 are disposed across section 11 in uniform spaced relationship to each other and define a straight row, herein referred to as "first file". Medial panel holes 17 are likewise disposed across section 11 in uniform spaced relationship to each other to define a second straight row, herein referred to as "second file".

Figure 4:
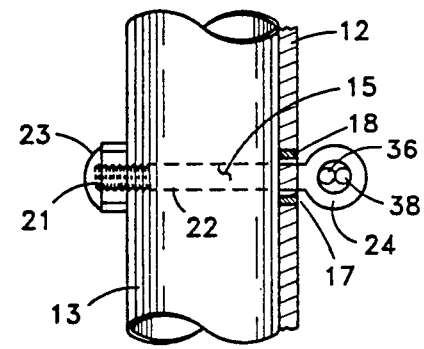
FIG. 4 is a fragmentary view, partially in cross-section of securing means attaching a panel portion to a post in accordance with the present invention.

A preferred fastener, for example fastener 20, comprises an eyebolt 21 having a shank portion 22 having a sufficient length to extend through a pair of registered holes, such as medial post hole 15 and medial panel hole 17, to secure horizontally extending section 11 to post members 13 as shown in FIG. 4. The remote end of shank portion 22 is suitably threaded which enables fastener 20 to be secured to post member 14 by screwing domed threaded nut 23 thereupon. Eyebolt 21 includes an eyelet portion 24 having an outside diameter sufficiently larger than the diameter of panel hole 16 to present each net-like panel portion 12 of horizontally extending section 11 from slipping thereover and causing section 11 to become detached from support pole member 13. Each succeeding support pole 13 is secured to net section 11 in a like fashion until all support pole members 13 are disposed in spaced generally parallel relationship to each other to segregate horizontally extending section 11 into a plurality of essentially uniform panel portions panel members 12 as will hereinafter be described in detail.

In one practice of the present invention as shown in FIG. 1, two horizontally extending sections 11 will be assembled. Each section 11 contains six panel portions 12, each of which is approximately twelve feet in length. The demarcation between adjacent panel portions is defined by a support pole 13 attached to netting sections 11 in the manner just described.

Each horizontally extending section 11 of corral assembly 10 is completed by providing a rigid metal pole 26 at one end thereof, e.g., the proximal end, and a plastic pole member 30, which is similar to pole member 13 but has different hardware attached thereto as will hereinafter be described, at the other end 28 thereof, e.g., the distal end, as will now be described.

Metal pole 26 is secured to the proximal end 32 of horizontally extending section 11 using the same means as are described above for attaching individual poles 13 to the netting section 11 to define individual panel portions 12. Thus, a suitable fastener 19 is extended through the upper hole 16 defined in panel portion 12 and the upper hole 14 defined in support pole 26 and secured to prevent separation of the netting panel 12 and the pole 26 from each other at the upper portion thereof. A like fastener 20 is extended through medial holes 15, 17 to connect the netting panel portion 12 and the pole 26 at the middle portion thereof.

Figure 2:
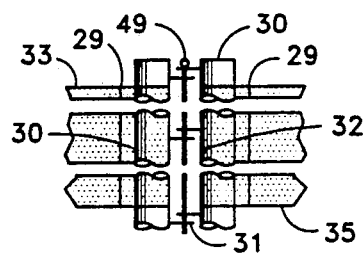
FIG. 2 is an enlarged breakaway view of the rear of the device of FIG. 1.

The remote end 28 of horizontally extending section 11, as shown in FIGS. 1 and 2, is preferably treated a little differently in that the last few inches of section 11 are doubled back over the netting and secured to the netting using tape, sewing, Velcro ® fasteners or the like, to define an envelope 29 of sufficient dimensions to encase end pole 30 therewithin.

A continuous rope member 36 is secured at one end thereof to metal pole 26 and extends transversely across each panel portion 12 and through each eyelet 24 of middle securing means 20 for attachment to the middle eyebolt 31 extending from the leading edge 32 of section 11 at end pole 30.

End pole 30 is then provided with three eyebolts 31 on the leading edge 32 thereof, one being disposed just above the upper edge 33 of netting 34, one in the middle of netting 34, and one just below the lower edge 35 of netting 34.

These eyebolts 31 each present an annular opening in registry with each other for a purpose to be hereinafter described.

A like horizontally extending section 11 is assembled in the same fashion. The two sections are assembled into a corral assembly 10 in the manner to now be described.

A suitable rope such as hollow-braid rope 38 is operatively associated with each support pole 13 and connected to upper fastener means 19 and middle fastener means 20, in a manner to be explained, and is anchored by an appropriate stake member 40 disposed radially outward from each support pole 13 as will appear.

Figure 6:
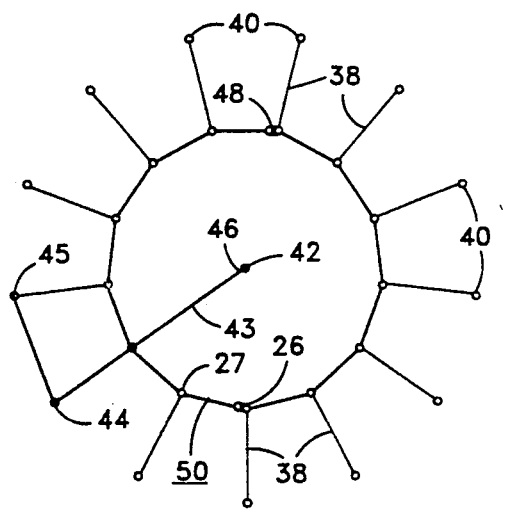
FIG. 6 is a plan view showing the use of a guide rope to position the several stakes for assembly of the device of FIG. 1.

The erection of a rope corral assembly 10 in accordance with the present invention will now be described. To erect a rope corral assembly 10 having, for instance, an inside diameter of approximately fifty feet, the installer first selects an area which appears reasonably flat and unobstructed and drives a center pivot stake 42 in the center of the selected area, as shown in FIG. 6. Next, a guide rope 43, supplied with assembly 10, is attached by one end to center stake 42 and stretched radially therefrom until a first premarked indicia 44, prepositioned to reflect the size of the particular assembly 10, in this case showing 32' 10" is located. The installer then, gripping the indicia 44, stretches the rope 43 to define the full 32' 10" radius. Using that radius, the installer walks the circumference of the circle defined thereby to assure that no building, out cropping, or other obstacles fall within the defined area. Upon completion of that walk without incident, the installer decides where the gateway for the corral assembly is to be located using subjective criteria. Having decided, the installer lays each horizontally extending section 11 on the ground adjacent the gateway location, approximately six feet apart. Each section 11 is then stretched out on the ground from its respective steel pole 26 in a generally semi circular path, both sections extending to the rear of the proposed corral area.

Next, using guide rope 43, anchored to center stake 42 as described, the installer drives a first stake 40 at the indicia 44 which, for sake of illustration, may be the stake 40 for gate pole 26. In practice, indicia 44 is provided simply as a knot in the rope or it can be a piece of colored tape wrapped about the rope at the desired distance from the end. Each stake 40 is similar in size to a conventional metal tent stake, that is $\frac{3}{8}''\times 12''$, for normal ground and will preferably be from about 14 to about 22 inches in length when use is to occur in loose or sandy soil. Stake 40, when driven into the ground will preferably be toed in so that the force vector created thereby will be on a radially outward path when the installation is complete for reasons which will hereafter become apparent.

When the first stake 40 is suitably deployed, a second feature of guide rope 43 enables the installer to locate the site of the next adjacent stake. As shown in FIG. 6, this is done by hooking the remote end 45 of guide rope 43, which preferably has a loop defined therein, to the first driven stake 40, that is, the stake already deployed, and thereafter stretching rope 43, while holding indicia 44, toward the approximate location of the next stake 40 while the near end 46 of rope 43 remains secured to center stake 42. When rope 43 is fully extended radially of center stake 42 and relatively tangentially from the driven stake 40, the next stake 40 is driven into the ground at indicia 44 in the "elbow" defined thereby. Loop end 45 is then unhooked from the first stake 40 and hooked to the second stake 40. The rope 43 is then stretched again to locate the site for the third stake 40 which is again located by indicia 44. This procedure is repeated until all of the stakes (13 in the case of the 50 foot ring) are driven into the ground in the generally circular path defined using guide rope 43 in the manner described.

Next, the installer loosely secures one rope 38 to each of the several pole members 13 at fastener 19 and to the stake 40 corresponding thereto. Rope 38 is lashed to its respective stake 40 and the remainder thereof is directed back to pole member 13 to be secured to fastener 20. The installer then walks the interior of the structure defined thereby and, moving from pole to pole, stands each pole member 13 upright relative to and upon the ground.

Figure 3:
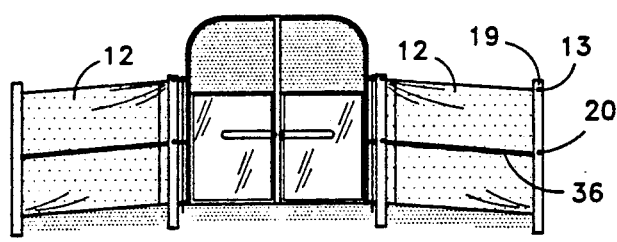
FIG. 3 is a side elevation of an alternative embodiment of an animal training and restraining device embodying the present invention.

When two sections 11 are employed, to create corral assembly 10, the end poles 30 of each horizontally extending section 11 will cooperate to define a rear seam 48, as shown in FIGS. 1 and 2, which is located approximately diametrically opposite the center of gateway 50. These adjacent poles 30 are locked to each other by inserting a suitable rod member 49 downwardly through cooperative eyebolts 31 installed in spaced cooperative relationship on the facing surfaces of the adjacent poles as previously described. This same connection is replicated when desired to incorporate a portable stall or trailer between adjacent poles 30 as shown in FIG. 3 except that the stall or trailer will also have outreaching eyebolts mounted on each side thereof for receiving and coacting with rod member 49 to secure section 11 to the stall or trailer and complete the enclosure therewith.

After the installer has completed the steps of installing all of the stakes 40, securing each of the pole ropes 38 to their respective stakes 40, and standing the individual poles 13, 30 in a vertical posture upon the ground, each of the several ropes 38, preferably hollow braid ropes, will be tightened by pulling on each corresponding tail 39 which extends outwardly therefrom. Hollow braid rope, by its very nature, provides for the free end of the rope, after attachment, to be threaded down the hollow core of a portion of the rope adjacent the point of attachment, and then fed out through the outer wall to provide a protruding portion or tail 39.

In one embodiment, each rope 38 will be secured at one end to and through fastener 19, 20 respectively, and anchored at its other end to its corresponding stake 40. When placed as indicated, the tension in each rope 38 is adjusted by pulling on respective tail 39 which extends outwardly therefrom. When thus installed, as will appear, a radially outward force is applied to the associated pole 13 and hence around the circumference of the circular pen by the coaction of each pole 13, rope 38 and stake 40 assembly.

For final dress, the installer can eyeball each pole 13 and straighten those which are not true simply by raising the pole 13 from the ground and setting it back down on the ground. The resiliency of each panel portion 12 and the pull of ropes 38 thereupon coact to readily align the corresponding support pole 13 in a substantially true vertical position and allow panel portion 12 to provide a rebound or trampoline effect when struck from the side.

Figure 5:
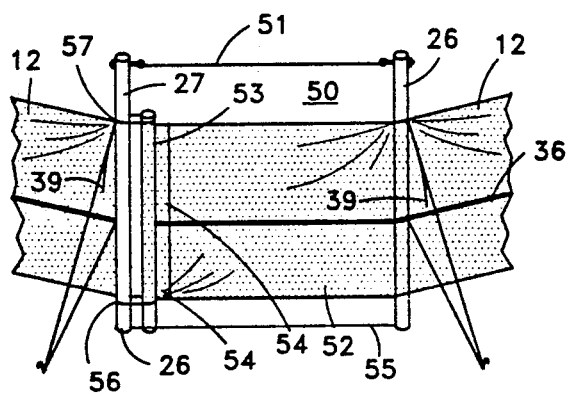
FIG. 5 is a fragmented segment of a gate assembly in a multisection rope corral embodying the present invention.

Adjacent gate poles 26 are staked and positioned using the same procedure employed to stake and position support poles 13 around the perimeter of corral assembly 10. A rope member 51 is connected to and extends between the upper end 27 of each pole 26 and coacts therewith to maintain gate pole 26 in a generally parallel relationship to each other as shown in FIG. 5. A second rope member 55 extends between the lower ends of gate both poles 26 for a like reason. Gate panel member 52 is made of the same netting as panel portion 12 and has a width substantially equal to the space between gate poles 26, that is, about 6 feet. A support pole member 13 is attached at the free end 53 of panel member 52 by inserting pole member 13 into a suitable envelope 54 formed therein in the same fashion as described for envelope 29.

Panel member 52, when extended between gate posts 26, is secured at its free end 53 by attaching adjacent support pole 13 to gate post 26 by lashing or other convenient means. Thus, gateway 50 can be totally closed in a well known, albeit rustic, fashion of inserting one end of the movable support pole 13 into a first loop 56 circumscribing the lower end of gate post 26 and sliding a second loop 57, sized to hold the moveable support pole 13 and the stationery post 26 in generally parallel relationship to each other, down over the upper reach of support pole 13. Rope corral assembly 10 is thus assembled and ready for use in training horses and the like with methods calculated to achieve both respect and obedience from an untrained or recalcitrant animal including those previously condemned as "untrainable".

As shown in FIGS. 1 and 2, a preferred embodiment for joining adjacent horizontally extending sections 11 comprises coupling adjacent support poles 13, each of which is secured by an upper and a lower rope 38 to a stake 40 driven into the ground as described above. The two ropes 38 are secured respectively to fasteners 19, 20, first fastener 19 being mounted adjacent the top of pole 13 and second fastener 20 being mounted at the midpoint of pole 13. As previously shown, this configuration provides for stable, secure, self-aligning support of each support pole 13 and the rope-around horizontally extending sections 11 attached thereto. End poles 30 are joined together by inserting a suitable rod member 49 downwardly through eyebolts 31 which are formed on each pole and extend outwardly from the leading edge 32 thereof into registered relationship with each other along the vertical axis of rod 49 when passed therethrough.

Referring to FIG. 6, a plan view of a circular corral assembly 10 of the present invention is shown. As will hereinafter appear, a circular configuration is preferred when the rope corral assembly 10 is to be employed for training because it has been shown that a circular corral area provides a definite benefit in teaching the animal to develop a positive attitude toward the trainer's requests. The trampoline-like flexibility of the rope-around horizontally extending sections 11 further provides a safety benefit for the animal contained within the corral because the material is strong enough to contain while being flexible enough to allow an animal to "bounce" off its surface without injury should collision occur. This feature is especially beneficial during initial stages of training as will hereinafter appear.

To utilize corral assembly 10 in the training of a recalcitrant or untrained horse, the animal is first brought into the rope-around corral wearing a halter to which a lead is attached. The halter is then removed and the horse is released and allowed to run the ring, first clockwise and then counter-clockwise, or vice versa if desired. This allows the animal to burn up some of its excess energy and to gain familiarity with its surroundings. Once the horse realizes that he can not escape the pen, his mind will begin to concentrate on what is happening within the ring. Note that throughout the preliminary period, the horse has found by his long vision that he can see out through the corral and therefore is not frightened. At the same time, the animals near lateral vision see the woven panel 12 as a "closed wall" and therefore to be avoided.

A preferred material for creating the rope-around sections 11 of corral assembly 10 is a material formed of polyvinyl chloride and vinyl coated elastic and polyester yarn which has been ventilated and treated for fade and abrasion resistance. The support poles 13 can be formed of PVC pipe that has been ultraviolet stabilized for durability. The several ropes employed herewith are preferably half-inch hollow braid, polypropylene, ultraviolet stabilized material while the stakes are made of plastic, steel, wood or like materials. The gate posts are preferably steel.

From the foregoing, it is readily apparent that means and methods for training and containing animals has been herein described and illustrated which fulfills all of the aforestated objectives in a remarkably unexpected and unique fashion. It is, of course, understood that such modifications, alterations and adaptions as may readily occur to the artisan confronted with this disclosure are intended within the spirit of this invention which is limited only by the scope of the claims appended hereto.

Accordingly, what is claimed is:

1. A rope corral assembly comprising an elongated generally rectangular netting section having a proximal end, a distal end, and central longitudinal axis extending therebetween; rope means extending between said proximal end and said distal end adjacent said central longitudinal axis, a plurality of pole members disposed transversely of said netting section and secured thereto in spaced generally parallel relationship to each other; means for connecting said proximal and distal end to enclose an area within said enclosed netting section; and means disposed outside of said area for maintaining each said pole member in a substantially upright position upon the ground to complete the corral assembly.

2. A rope corral assembly according to claim 1 comprising a first and a second netting section.

3. A rope corral assembly according to claim 1 in which said distal end of said netting section has an envelope formed therewith for securing one of said poles therewithin.

4. A rope corral assembly according to claim 2 in which said distal end of said netting section has an envelope formed therewith for securing one of said poles therewithin.

5. A rope corral according to claim 1 in which said rope means comprises a continuous rope member extending between said proximal and said distal end along said central longitudinal axis in a fixed position relative thereto.

6. A rope corral assembly according to claim 2 in which said rope means comprises a continuous rope member extending between said proximal and said distal end along said central longitudinal axis in a fixed position relative thereto.

7. A rope corral assembly according to claim 1 in combination with a portable stall in which said portable stall is operatively interposed between said proximal end and said distal end of said netting section and secured thereto.

8. A rope corral assembly according to claim 2 in which a steel support pole is operatively secured to said proximal end of each said sections.

9. A rope corral assembly according to claim 8 in which said steel support poles are disposed in generally parallel spaced relationship to each other to define a gateway therebetween.

10. A rope corral assembly for training and containing animals comprising: a plurality of support poles disposed in spaced generally parallel relationship to each other and having an upper and a medial fastener secured thereto; a horizontally extending elongated mesh section having an upper edge, a lower edge, a proximal end, a distal end and a plurality of openings defined therethrough in spaced relationship to each other; said openings defining a first and second horizontal file extending between said proximal end and said distal end, said first file being disposed adjacent said upper edge of said section, each said openings therein being adapted to receive therethrough one of said upper fasteners from a different one of said poles, said second file being disposed in spaced generally parallel relationship to said first file along the longitudinal median of said section, each of said openings in said second file being adapted to receive one of said medial fasteners from a different one of said poles; an elongated rope member secured to and extending from said distal end of said mesh section to said proximal end of said section and extending through said medial fasteners; a plurality of stake members disposed in the ground, each stake member being positioned adjacent a different one of said pole members outboard of said mesh section; and rope means operatively connecting each of said fasteners to a corresponding one of said stake members and coactive with the remainder of said similarly secured poles to raise said section and create a resilient corral theretwith.

11. A rope corral assembly according to claim 10 in which a first independent rope means is operatively connected between said stake member and said upper fastener on the one of said poles associated therewith and a second independent rope means is operatively connected between said stake member and said medial fastener on said one of said poles.

12. A rope corral assembly according to claim 10 comprising a first and a second mesh section, each section having a proximal and a distal end, said proximal ends coacting to define a gate way therebetween, each said distal end having a plurality of rod receiving means extending outwardly therefrom in registered relationship with each other, said rod receiving means of said adjacent ones of said distal end being registerable with each other; and a rod member insertable through said registered rod receiving means to secure said distal ends together.

13. A rope corral assembly according to claim 12 in which said elongated rope member of said first mesh section and said elongated rope member of said second mesh section are interconnected to form a continuous rope around said corral assembly.

14. A rope corral assembly according to claim 10 in which a first independent rope means is operatively connected between said stake member and said upper fastener on the one of said poles associated therewith and a second independent rope means is operatively connected between said stake member and said medial fastener on said one of said poles.

* * * * *